US012639366B2

(12) United States Patent
Terrazas et al.

(10) Patent No.: US 12,639,366 B2
(45) Date of Patent: May 26, 2026

(54) SYSTEMS AND METHODS FOR A PET IMAGE SEARCH BASED ON A PET IMAGE CREATED BY A USER

(71) Applicant: Mars, Incorporated, McLean, VA (US)

(72) Inventors: Isabella Terrazas, Stanford, CA (US); Ignacio Gatti, Buenos Aires (AR); John Orozco, Buenos Aires (AR); Rohan Kothakupu, Chicago, IL (US); Cameron Turner, Palo Alto, CA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 18/838,726

(22) PCT Filed: Jan. 31, 2023

(86) PCT No.: PCT/US2023/061621
§ 371 (c)(1),
(2) Date: Aug. 15, 2024

(87) PCT Pub. No.: WO2023/158920
PCT Pub. Date: Aug. 24, 2023

(65) Prior Publication Data
US 2025/0139156 A1      May 1, 2025

Related U.S. Application Data

(60) Provisional application No. 63/311,553, filed on Feb. 18, 2022.

(51) Int. Cl.
*G06F 16/538* (2019.01)
*G06F 16/532* (2019.01)
(Continued)

(52) U.S. Cl.
CPC .......... *G06F 16/538* (2019.01); *G06F 16/532* (2019.01); *G06F 16/583* (2019.01); *G06V 10/40* (2022.01)

(58) Field of Classification Search
CPC ..... G06F 16/538; G06F 16/583; G06F 16/532
(Continued)

(56) References Cited

U.S. PATENT DOCUMENTS 10,769,807 B1 * 9/2020 Pereira ..................... G06T 11/00
11,398,099 B1 * 7/2022 Balakrishnan ........ G06F 16/338
(Continued)

FOREIGN PATENT DOCUMENTS

CA      3011713 A1    1/2020
CN  109308324 A    2/2019

OTHER PUBLICATIONS

Bedner, Kelli. "New Program Matches Kids' Doodles of Their Dream Pets with a lookalike Adoptable Resue Dogs." Mar. 9, 2022. https://people.com/pets/pedigree-rescue-doodles-progam/ (Year: 2022).*
(Continued)

*Primary Examiner* — Kimberly L Wilson
(74) *Attorney, Agent, or Firm* — Bookoff McAndrews, PLLC

(57) ABSTRACT

A computer-implemented method for analyzing a pet sketch to determine one or more matching pet images is disclosed. The method includes receiving the pet sketch from a user device, analyzing the pet sketch to determine one or more characteristics corresponding to the pet sketch, sending an API request to at least one external system, the API request including the one or more characteristics of the pet sketch, in response to sending the API request, receiving the one or more matching pet images from the at least one external system, and displaying, by the one or more processors, the one or more matching pet images on the user device.

20 Claims, 7 Drawing Sheets

(51) Int. Cl.
*G06F 16/583* (2019.01)
*G06V 10/40* (2022.01)

(58) Field of Classification Search
USPC .......................................................... 707/728
See application file for complete search history.

(56) References Cited

U.S. PATENT DOCUMENTS

| | | | | |
|---|---|---|---|---|
| 11,425,892 | B1 * | 8/2022 | Bennett | ................... G06V 40/18 |
| 2013/0142398 | A1 * | 6/2013 | Polimeno | .............. G06F 3/0484 |
| | | | | 382/110 |
| 2015/0046354 | A1 * | 2/2015 | Wilkins | ................. G06Q 50/01 |
| | | | | 705/319 |
| 2016/0350336 | A1 * | 12/2016 | Checka | ................ G06V 10/454 |
| 2017/0364537 | A1 * | 12/2017 | Kariman | ............ G06Q 10/0637 |
| 2020/0118173 | A1 * | 4/2020 | Chu | ......................... G06F 16/27 |
| 2020/0250733 | A1 * | 8/2020 | Hullverson | .............. G06N 3/08 |
| 2020/0401594 | A1 * | 12/2020 | Hewlett | ............ G06F 16/24578 |
| 2021/0311936 | A1 | 10/2021 | Jin et al. | |
| 2022/0147588 | A1 * | 5/2022 | Xue | ................... G06Q 10/1053 |
| 2023/0090269 | A1 * | 3/2023 | Vasudevan | ............ G06F 16/583 |
| | | | | 382/317 |

OTHER PUBLICATIONS

International Search Report issued in International Application No. PCT/US2023/061621 dated Mar. 21, 2023 (11 pages).

* cited by examiner

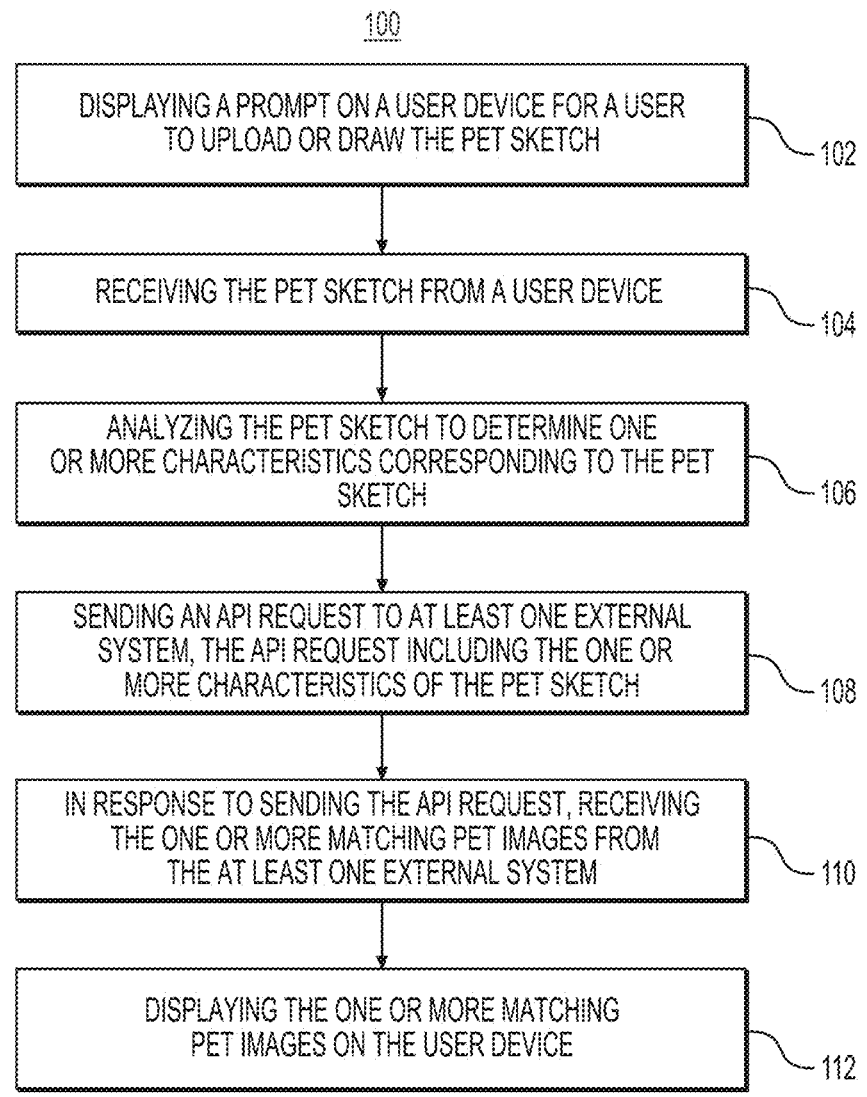

100

DISPLAYING A PROMPT ON A USER DEVICE FOR A USER
TO UPLOAD OR DRAW THE PET SKETCH — 102

RECEIVING THE PET SKETCH FROM A USER DEVICE — 104

ANALYZING THE PET SKETCH TO DETERMINE ONE
OR MORE CHARACTERISTICS CORRESPONDING TO THE PET
SKETCH — 106

SENDING AN API REQUEST TO AT LEAST ONE EXTERNAL
SYSTEM, THE API REQUEST INCLUDING THE ONE OR
MORE CHARACTERISTICS OF THE PET SKETCH — 108

IN RESPONSE TO SENDING THE API REQUEST, RECEIVING
THE ONE OR MORE MATCHING PET IMAGES FROM
THE AT LEAST ONE EXTERNAL SYSTEM — 110

DISPLAYING THE ONE OR MORE MATCHING
PET IMAGES ON THE USER DEVICE — 112

*FIG. 1*

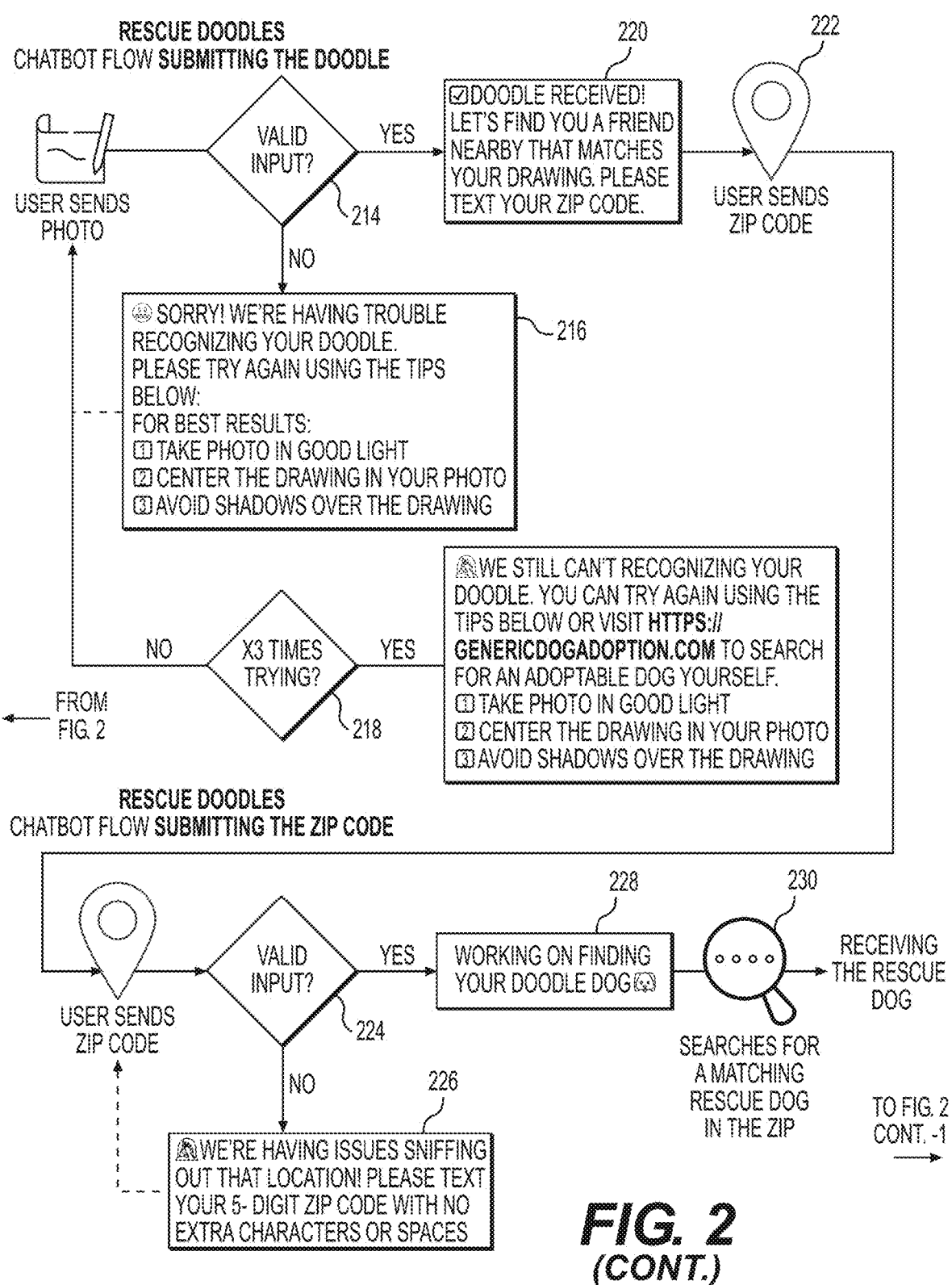

RESCUE DOODLES
CHATBOT FLOW SUBMITTING THE DOODLE

220

222

USER SENDS PHOTO

VALID INPUT? — 214

YES

☑DOODLE RECEIVED! LET'S FIND YOU A FRIEND NEARBY THAT MATCHES YOUR DRAWING. PLEASE TEXT YOUR ZIP CODE.

USER SENDS ZIP CODE

NO

☹SORRY! WE'RE HAVING TROUBLE RECOGNIZING YOUR DOODLE.
PLEASE TRY AGAIN USING THE TIPS BELOW:
FOR BEST RESULTS:
① TAKE PHOTO IN GOOD LIGHT
② CENTER THE DRAWING IN YOUR PHOTO
③ AVOID SHADOWS OVER THE DRAWING — 216

⚠WE STILL CAN'T RECOGNIZING YOUR DOODLE. YOU CAN TRY AGAIN USING THE TIPS BELOW OR VISIT HTTPS:// GENERICDOGADOPTION.COM TO SEARCH FOR AN ADOPTABLE DOG YOURSELF.
① TAKE PHOTO IN GOOD LIGHT
② CENTER THE DRAWING IN YOUR PHOTO
③ AVOID SHADOWS OVER THE DRAWING

NO

X3 TIMES TRYING? — 218

YES

FROM FIG. 2

RESCUE DOODLES
CHATBOT FLOW SUBMITTING THE ZIP CODE

228

230

USER SENDS ZIP CODE

VALID INPUT? — 224

YES

WORKING ON FINDING YOUR DOODLE DOG🐾

SEARCHES FOR A MATCHING RESCUE DOG IN THE ZIP

RECEIVING THE RESCUE DOG

NO

226

⚠WE'RE HAVING ISSUES SNIFFING OUT THAT LOCATION! PLEASE TEXT YOUR 5- DIGIT ZIP CODE WITH NO EXTRA CHARACTERS OR SPACES

SYSTEMS AND METHODS FOR A PET IMAGE SEARCH BASED ON A PET IMAGE CREATED BY A USER

CROSS-REFERENCE TO RELATED APPLICATION(S)

This is a National Stage Application under 35 U.S.C. § 371 of International Application No. PCT/US2023/061621, filed on Jan. 31, 2023, which claims priority to U.S. Patent Application No. 63/311,553, filed on Feb. 18, 2022, the entireties of which are incorporated herein by reference.

TECHNICAL FIELD

Various embodiments of this disclosure relate generally to determining a pet from a sketch of a pet created by a user. In some embodiments, the disclosure relates to systems and methods for using a machine learning model to analyze a sketch of a pet to determine a matching pet image.

BACKGROUND

When a future pet owner searches for a pet to adopt or purchase, the future pet owner may believe that the pet's appearance is one of the most important search variables. Future pet owners may find the pet search process to be very difficult because there are a multitude of pet breeds that have different appearances. Moreover, future pet owners are unfamiliar with the appearance of each pet breed.

Conventional methods may include the future pet owner performing word searches that describe the pet's appearance, in order to find a particular pet. However, such conventional methods are challenging for a future pet owner, as the future pet owner may not know the proper terms to correctly describe the pet. Additionally, future pet owners may want their children to be a part of the pet selection process. However, children may not know the right words to communicate the desired appearance of the pet.

This disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for analyzing a pet sketch to determine a matching pet image, where the matching pet image corresponds to a pet.

In one aspect, an exemplary embodiment of a method for analyzing a pet sketch to determine a matching pet image may include receiving, by one or more processors, the pet sketch from a user device. The method may further include analyzing, by the one or more processors, the pet sketch to determine one or more characteristics corresponding to the pet sketch. The method may further include sending, by the one or more processors, an API request to at least one external system, the API request including the one or more characteristics of the pet sketch. The method may further include, in response to sending the API request, receiving, by the one or more processors, the one or more matching pet images from the at least one external system. The method may further include displaying, by the one or more processors, the one or more matching pet images on the user device.

In a further aspect, an exemplary embodiment of a computer system for analyzing a pet sketch to determine a matching pet image is disclosed, the computer system comprising at least one memory storing instructions, and at least one processor configured to execute the instructions to perform operations. The operations may include receiving the pet sketch from a user device. The operations may further include analyzing the pet sketch to determine one or more characteristics corresponding to the pet sketch. The operations may further include sending an API request to at least one external system, the API request including the one or more characteristics of the pet sketch. The operations may further include, in response to sending the API request, receiving the one or more matching pet images from the at least one external system. The operations may further include displaying the one or more matching pet images on the user device.

In a further aspect, a non-transitory computer-readable medium storing instructions that, when executed by a processor, cause the processor to perform operations for analyzing a pet sketch to determine a matching pet image is disclosed. The operations may include receiving the pet sketch from a user device. The operations may further include analyzing the pet sketch to determine one or more characteristics corresponding to the pet sketch. The operations may further include sending an API request to at least one external system, the API request including the one or more characteristics of the pet sketch. The operations may further include, in response to sending the API request, receiving the one or more matching pet images from the at least one external system. The operations may further include displaying the one or more matching pet images on the user device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 1 depicts a flowchart of an exemplary method for analyzing a pet sketch to determine a matching pet image, according to one or more embodiments.

DETAILED DESCRIPTION OF EMBODIMENTS

Figure 2:
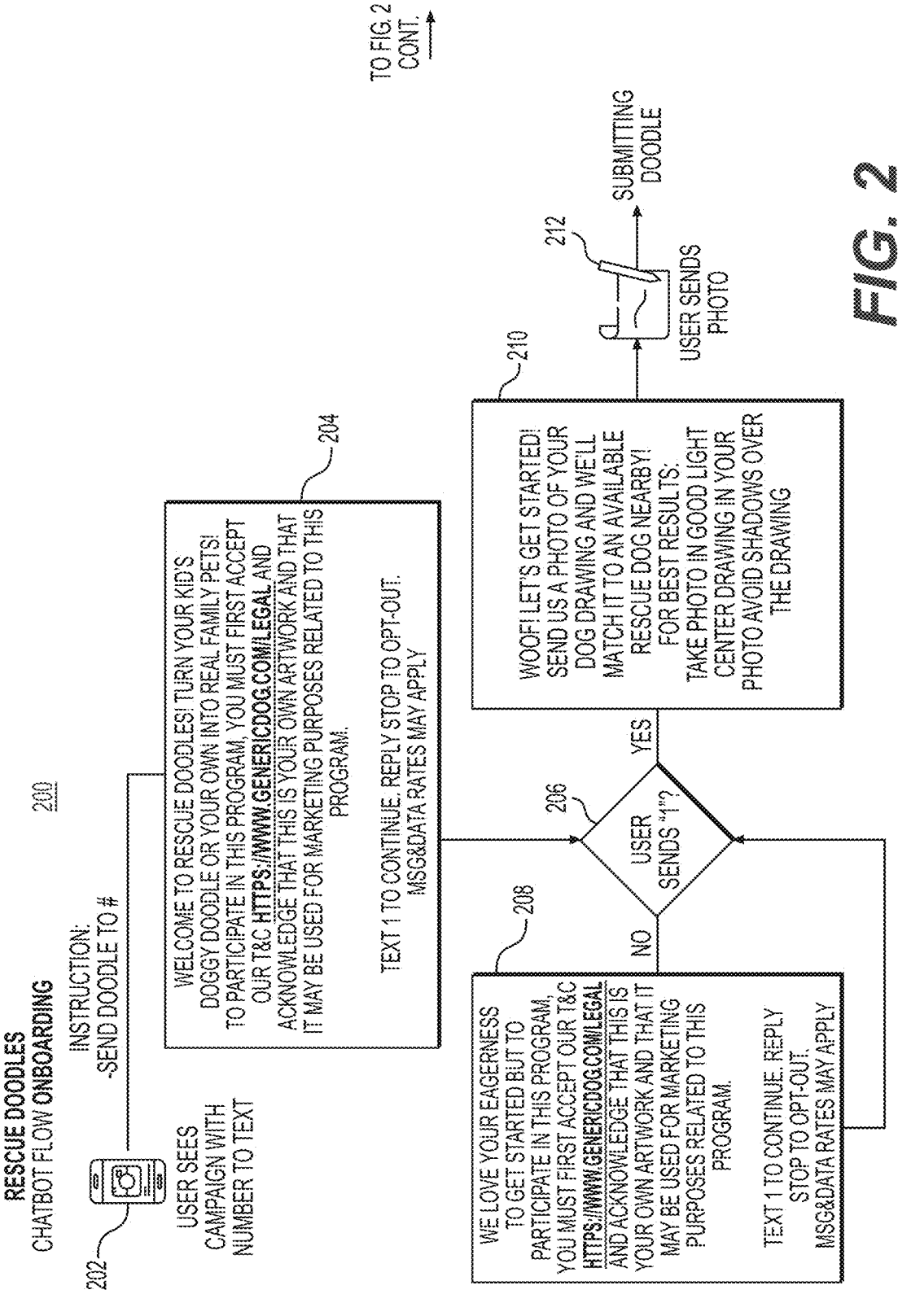
FIG. 2 depicts a flowchart of an exemplary embodiment for analyzing a pet sketch and determining a matching pet image corresponding to a pet, according to one or more embodiments.
Figure 2:
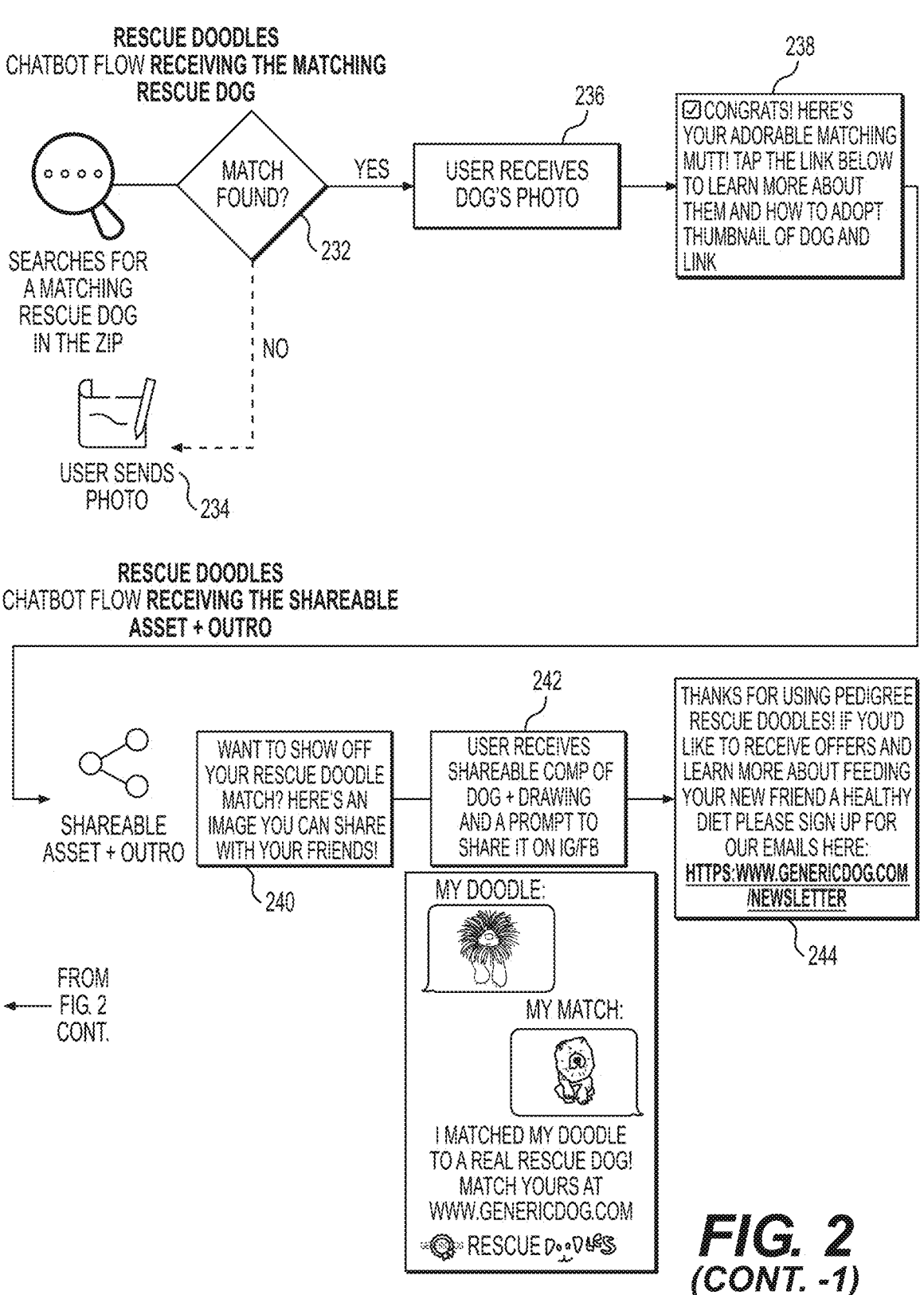

According to certain aspects of the disclosure, methods and systems are disclosed for analyzing a pet sketch to determine a matching pet image corresponding to a pet. Conventional techniques may not be suitable because conventional techniques may rely on the future pet owner manually inputting terms describing a pet's appearance into a search. Additionally, conventional techniques may not provide the ability to search for a pet based on a pet sketch. Accordingly, improvements in technology relating to analyzing a pet sketch to determine a matching pet are needed.

Selecting a pet to adopt or purchase is a very important process. A future pet owner frequently feels overwhelmed with the number of pet breeds. Additionally, a future pet owner may desire for the pet to have particular physical attributes. However, a future pet owner may find the process of expressing the desired physical attributes of the pet to be challenging. The future pet owner may not know the physical attributes of different pet breeds. Furthermore, future pet owners may want their children to be a part of the pet selection process. However, children may have difficulty expressing the desired physical attributes of the pet. Children may be able to express the desired physical attributes through drawing the pet, instead of using words.

A need exists for search techniques that analyze a sketch of a pet and use the analysis to determine a matching pet image that corresponds to a pet that is similar to the sketch. The search techniques disclosed herein may analyze a drawing by a future pet owner and/or a child to determine an image of a pet, such as a photograph, that most closely matches the drawing. Such search techniques may also find a matching pet image that corresponds to a pet that is available for purchase or adoption. The search techniques may also take the future pet owner's location into account, where the search technique finds a matching pet image that corresponds to a pet that is available for purchase or adoption, where the pet is located near the future pet owner.

As will be discussed in more detail below, in various embodiments, systems and methods are described for analyzing a pet sketch to determine a matching pet image. By analyzing a pet sketch to determine one or more characteristics corresponding to the pet sketch, the systems and methods may be able to determine one or more matching pet images that correspond to one or more pets. The systems and methods may then display the one or more matching pet images on a user device.

Exemplary Method for Determining One or More Matching Pet Images

FIG. 1 illustrates an exemplary method 100 for analyzing a pet sketch and determining a matching pet image corresponding to a pet, according to one or more embodiments. Notably, method 100 may be performed by one or more processors of a server that is in communication with one or more user devices and other external system(s) via a network. However, it should be noted that method 100 may be performed by any one or more of the server, one or more user devices, or other external systems.

The method may include displaying, by one or more processors, a prompt on a user device for a user to upload or draw the pet sketch (Step 102). For example, the prompt may be displayed on a user interface of the user device. In some embodiments, the prompt may be part of an advertising campaign or a pet service to facilitate the adoption and/or purchase of a pet. In some embodiments, the prompt may be in response to the user device scanning a QR code or selecting a link.

The method may include receiving, by one or more processors, the pet sketch from a user device (Step 104). The receiving may be in response to the prompt on the user device. The pet sketch may be a representation of one or more pets, where one or more users may have created the pet sketch. In some embodiments, the pet sketch may be a user drawing or a pet photograph. A user may draw the pet sketch using a writing device, such as a pen, crayon, pencil, paint, etc. The user may scan the pet sketch and upload the scanned pet sketch to the user device and/or an external storage (e.g., a database). Alternatively, the user may use the user device to capture the pet sketch (e.g., take a photograph), as well as store the pet sketch on the user device. Alternatively, the user may draw the pet sketch directly onto the user device. For example, the user may draw (e.g., by using a finger or a stylus) the pet sketch on a user interface of the user device, where the user interface may capture and/or save the pet sketch to the user device and/or other external storage.

Alternatively, the user may create the pet sketch by taking a photograph of one or more pets. For example, the user may take a photograph of the one or more pets via the user device. By way of another example, the user may take the photograph of the one or more pets by using a device that is different from the user device (e.g., a digital camera). The user may then transfer the photograph to the user device.

The method may include receiving the pet sketch from the user device (Step 104), the pet sketch having been uploaded by the user. Alternatively, as discussed above, the user device may capture and/or save the pet sketch automatically as the user draws the pet sketch. In some embodiments, the user may manually upload the pet sketch from an external storage.

In some embodiments, the method may also include receiving user location information from the user device. The user location information may be in the form of a zip code, GPS coordinates, etc. In one embodiment, a user may manually upload the zip code. In some embodiments, the user device may receive a location request. In response to the location request, the user device may automatically send the location information, without the need for the user to manually enter the location information. Furthermore, in another embodiment, the method may include determining whether the location information is valid. If the location information is not valid, the user may be prompted to input new location information.

The method may include analyzing, by the one or more processors, the pet sketch to determine one or more characteristics corresponding to the pet sketch (Step 106). For example, the one or more characteristics may include at least one of: a color, a hair type, an ear length, a limb length to body length ratio, tail length and/or shape, a body shape, a head shape, a snout length, a color pattern, an ear shape and/or size, or snout dimensions and/or shape. The color may correspond to one or more colors and/or color patterns of the pet in the pet sketch. Example colors may include black, brown, white, or a mixture of colors. Additionally, for example, the color pattern may be a unique pattern of the pet in the pet sketch, such as black and white spots (e.g., a Dalmatian) or a black body with white paws. The hair type may correspond to one or more types/textures of the fur and/or hair of the pet in the pet sketch. Example hair/fur types may include curly, straight, long, short, and the like. The ear length may correspond to whether the pet in the pet sketch has short ears, long ears, floppy ears, pointed ears, etc. The limb length to body length ratio may correspond to at least one ratio between the length of the pet's limbs and the length of the pet's body of the pet in the pet sketch. The tail length may correspond to the pet's tail length of the pet in the pet sketch. For example, the length of the tail may be short, long, or expressed in inches, feet, and the like. The tail shape may correspond to the shape of the tail of the pet in the pet sketch. Example tail shapes may include straight, curly, thick, thin, and the like. The body shape may correspond to the shape of the body of the pet in the pet sketch. Example body shapes may include stalky, lanky, long, short, and the like. The head shape may correspond to the shape of the head of the pet in the pet sketch. Example, head shapes may include round, pointed, small, large, and the like. Additionally, the head shape may include the location and/or configuration of the eyes and the nose of the pet in the pet sketch. The snout length may correspond to the shape of the snout of the pet in the pet sketch. Example snout lengths may be short, long, or expressed in inches, feet, and the like. The ear shape may correspond to the shape of one or both ears of the pet in the pet sketch. Example ear shapes may include round, pointed, fold over, and the like. The ear size may correspond to the size of one or both ears of the pet in the pet sketch. Example ear sizes may include small, large, or expressed in inches, and the like. The snout dimensions may correspond to the width and height of the snout of the pet in the pet sketch. For example, the snout dimensions may be expressed in inches, and the like. The snout shape may correspond to the shape of the snout of the pet in the pet sketch. Example snout shapes may include a short snout, a long snout, and the like.

In one embodiment, a machine learning model may be used to analyze the pet sketch to determine the one or more characteristics. The machine learning model may have been previously trained using data sets of pet sketches and the corresponding characteristics. The machine learning model may have also been previously trained using data sets of characteristics and corresponding pet breeds. In some embodiments, the machine learning model may comprise two models. For example, the first model may include removing the background of one or more pet sketches that have been pretrained with one or more matching pet images. Additionally, for example, the second model may predict one or more probable breeds based on the one or more characteristics of the image in the pet sketch.

In some embodiments, the method may also include analyzing the pet sketch to determine at least one breed associated with the pet sketch. The at least one breed may be recommended for the user to adopt and/or purchase based on the pet in the pet sketch. The analyzing may include using the one or more characteristics to determine the at least one breed. For example, as described above, a machine learning model may be used to predict one or more probable breeds based on the one or more characteristics of the image in the pet sketch. Additionally, for example, the machine learning model may have been previously trained using data sets of pet sketches, corresponding characteristics, and corresponding breeds.

The method may include sending, by the one or more processors, an API request to at least one external system, the API request including the one or more characteristics of the pet sketch (Step 108). The at least one external system may include at least one pet adoption service, at least one pet shelter, and/or at least one pet breeder.

The API request may include at least one of: the one or more characteristics, a characteristics threshold, a results threshold, the user location information, and/or a proximity. The API request may include some or all of the one or more characteristics. The characteristics threshold may correspond to a number, or a ratio, of the one or more characteristics that the one or more matching pet images should include. For example, the API request may include all of the one or more characteristics, as well as request that all matching pet images include all of the one or more characteristics. By way of another example, the API request may include all of the one or more characteristics, but may request that the matching pet images include at least half of the one or more characteristics. The results threshold may indicate a threshold for the number of matching pet images. For example, the API request may indicate a threshold number of ten, where there may be a maximum of ten matching pet images. The user location information may also be included, in order for the at least one external system to search for pet images that correspond to pets located near the location of the user device. The proximity may correspond to a number that indicates a maximum distance between the one or more pets in the one or more matching pet images and the user location information.

In some embodiments, the API request may specify that the at least one external service only search for one or more matching pet images that correspond to one or more pets that are available for adoption or purchase. For example, the user may submit the pet sketch in order to adopt or purchase a pet that matches the pet sketch.

In response to sending the API request, the method may include receiving, by the one or more processors, the one or more matching pet images from the at least one external system (Step 110). The one or more matching pet images may comprise photographs of one or more pets. The one or more matching pet images may correspond to pet images that are responsive to the one or more characteristics, the characteristics threshold, the results threshold, the user location information, and/or the proximity in the API request. For example, the one or more matching pet images may be images that share the same characteristics of the pet sketch. Additionally, the one or more matching pet images may correspond to available pets that are located within a particular proximity of the user device. In some embodiments, an error message may be returned if there are no matching pet images.

Upon receiving the API request, the at least one external system may query one or more databases located within the at least one external system. The query may include some or all of the information in the API request. The at least one external system may then send a response with one or more matching pet images, which are responsive to the API request. The response may also include additional information related to the one or more matching pet images. For example, the additional information may include the name, breed, age, weight, gender, and/or personality traits of some or all of the pets in the one or more matching pet images.

For example, the response from the at least one external system may include a matching pet image, where the matching pet image corresponds to a pet image that most closely matches the pet sketch. Additionally, the pet in the matching pet image may be located closest to the user device and available for adoption or purchase. By way of another example, the response from the at least one external system may include one or more matching pet images, where the one or more matching pet images correspond to one or more pets that are located within a proximity of the user location. The user device may receive the closest matching pet image, or a list of the one or more closest matching pet images, to display on the user device. The user device may also receive information corresponding to the closest matching pet image, or the list of the one or more closest matching pet images, to display on the user device.

Additionally, or alternatively, the at least one external system may query one or more databases located externally to the at least one external system. The query may include some or all of the information in the API request. For example, the at least one external system correspond to a pet adoption service. In some embodiments, upon receiving the API request, the pet adoption service may send an additional API request, which may include some or all of the information in the received API request, to one or more additional external systems. The one or more additional external systems may include one or more pet shelter systems, one or more pet breeder systems, or one or more additional pet adoption systems. The pet adoption service may receive responses from the one or more additional external systems, where the responses may include one or more matching pet images that are responsive to the additional API request.

The method may also include searching one or more databases to find the one or more matching pet images that correspond to the pet sketch, where the searching is based on the one or more characteristics. The one or more databases may be located, for example, in the external system. Additionally, the one or more databases may be located in an internal system, such as the database(s) 415A located in server system 415 in FIG. 4. The one or more databases may include database records that include previous database queries corresponding to previous pet sketches and previous one or more matching pet images. The database query may include the one or more characteristics, the characteristics threshold, the results threshold, the user location information, and/or the proximity, as described above. The one or more databases may return one or more matching pet images that are responsive to the database query. Alternatively, an error message may be returned if there are no matching pet images.

The method may include displaying, by the one or more processors, the one or more matching pet images on the user device (Step 112). Some or all of the one or more matching pet images may be displayed on the user device, such as via a user interface of the user device. The pet sketch may also be displayed in addition to the one or more matching pet images. In some embodiments, there may not be any matching pet images and an error message may be displayed on the user device.

In some embodiments, the method may also include displaying at least one breed recommendation identifying the determined at least one breed on the user device, such as via a user interface of the user device. In some embodiments, there may be no matching pet images. However, in such cases, there may be at least one breed recommendation, which may be displayed on the user device. In other embodiments, the method may identify both matching pet images and at least one breed associated with the pet sketch, but only the breed recommendation identifying the at least one breed may be displayed on the user device.

In other embodiments, the user device may also display additional information corresponding to the one or more pets in the one or more matching pet images. Example information may include the name, breed, age, weight, gender, feeding recommendations, and/or personality traits of some or all of the pets in the one or more matching pet images.

Additionally, or alternatively, the method may include displaying at least one link to the at least one external system (i.e., a link to a webpage hosted by the external system), where the at least one link corresponds to the one or more matching pet images. For example, if the user selects the at least one link, the user device may display a webpage that provides the user with additional information regarding the pet in the matching pet image, adopting the pet, or purchasing the pet.

The method may also include storing the pet sketch and the one or more matching pet images in the one or more databases (e.g., of the external system and/or of the internal system). For example, the one or more databases may include database records that include previous database queries and results. For example, the results may correspond to previous pet sketches and previous one or more matching pet images. The pet sketch and the one or more matching pet images may be stored in a database record in the one or more databases.

Although FIG. 1 shows example blocks of exemplary method 100, in some implementations, the exemplary method 100 may include additional blocks, fewer blocks, different blocks, or differently arranged blocks than those depicted in FIG. 1. Additionally, or alternatively, two or more of the blocks of the exemplary method 100 may be performed in parallel.

Exemplary Searching Embodiment

FIG. 2 illustrates an exemplary method 200 of an exemplary embodiment for analyzing a pet sketch and determining a matching pet image corresponding to a pet, according to one or more embodiments.

The method may include a user device displaying a campaign with a corresponding number to text to initiate the analyzing process (Step 202). For example, the user may initiate the analyzing process of the pet sketch by texting a code (e.g., "DOODLE"). The method may include the user device displaying a prompt, in response to the initiating, for the user to accept the terms and conditions of the campaign (Step 204). The method may further include the user accepting the terms and conditions by texting a code (e.g., pressing "1") (Step 206). Additionally, if the user does not accept the terms and conditions, the method may include displaying a reminder prompt on the user display for the user to accept the terms and conditions (Step 208). In some embodiments, the user may respond with a different code that indicates that the user does not want to participate in the campaign (e.g., texting "STOP").

Upon accepting the terms and conditions, the method may include the user device receiving and displaying a prompt asking the user to submit a pet sketch (e.g., "Send us a photo of your dog drawing and we'll match it to an available rescue dog nearby!") (Step 210).

In response to the prompt, the method may include the user submitting the pet sketch via the user device (Step 212). The user may submit the pet sketch by uploading a photo of the sketch (or of a pet) from the user device. Alternatively, the user may submit the pet sketch by drawing a pet sketch directly on a user interface of the user device.

The method may include analyzing the pet sketch to determine whether the pet sketch is valid (Step 214). If the pet sketch is not valid, the user device may display a notification to the user (e.g., "Sorry! We're having trouble recognizing your doodle. Please try again using the tips below.") (Step 216). If the user submits a pet sketch a certain number of times (e.g., three times), and the pet sketch is still unrecognizable, the user device may display an additional prompt that may direct the user to directly search for an adoptable pet on an external system (e.g., "You can try again using the tips below or visit https://genericdogadoption.com to search for an adoptable dog yourself.") (Step 218).

The method may include, in response to determining that the pet sketch is valid, the user device displaying a prompt for the user to submit location information (e.g., "Please text your zip code.") (Step 220). The method may further include the user submitting the location information via the user device (Step 222).

The method may include analyzing the location information to determine whether the location information is valid (Step 224). If the location information is not valid, the user device may display a notification to re-submit the location information (e.g., "Please text your 5-digit zip code with no extra characters or spaces.") (Step 226). If the location information is valid, the user device may display a prompt indicating that the analysis process of the pet sketch has begun (e.g., "Working on finding your doodle dog!") (Step 228).

The method may include analyzing the pet sketch to determine at least one matching pet image corresponding to a pet that is available near the user for adoption or purchase, as described in FIG. 1 (Step 230). The method may further include determining, based on the analyzing, whether the pet sketch matches at least one matching pet image (Step 232). If no matching pet image is found, the method may further include the user device prompting the user to submit a new pet sketch (Step 234). If at least one matching pet image is found, the method may further include sending the at least one matching pet image to the user device (Step 236). The user device may then display a notification indicating a match (e.g., "Congrats! Here's your adorable matching mutt!") (Step 238). In addition to displaying the at least one matching pet image, the user device may also display a link to the user device. If the user selects the link, the link may provide more information about the pet in the at least one matching pet image, as well as more information regarding how to adopt or purchase the pet.

The method may include the user device displaying a notification allowing the user to share the pet sketch and the at least one matching pet image to at least one social media account (e.g., "Want to show off your Rescue Doodle match? Here's an image you can share with your friends!") (Step 240). The method may further include the user device displaying a composite of the pet sketch and the one or more matching pet images, as well as a prompt to share the composite (Step 242). The user device may then share the composite to at least one social media account.

The method may also include the user device displaying a link to allow the user to sign up for offers and feeding information (e.g., "If you'd like to receive offers and learn more about feeding your new friend a healthy diet please sign up for our emails here . . . ") (Step 244). The device may also receive and display at least one recommendation to the user, where the at least one recommendation is based on the pet corresponding to the at least one matching pet image. For example, if the at least one matching pet image corresponds to a golden retriever, the user device may receive and display an advertisement on the user device, where the advertisement may correspond to dog food that is meant for golden retrievers. The at least one recommendation may correspond to a personalized advertisement, a personalized product suggestion, a personalized pet service suggestion, or a suggestion to register for a personalized communication.

Exemplary Platform for Analyzing a Pet Sketch

Figures 3A, 3B, 3C:
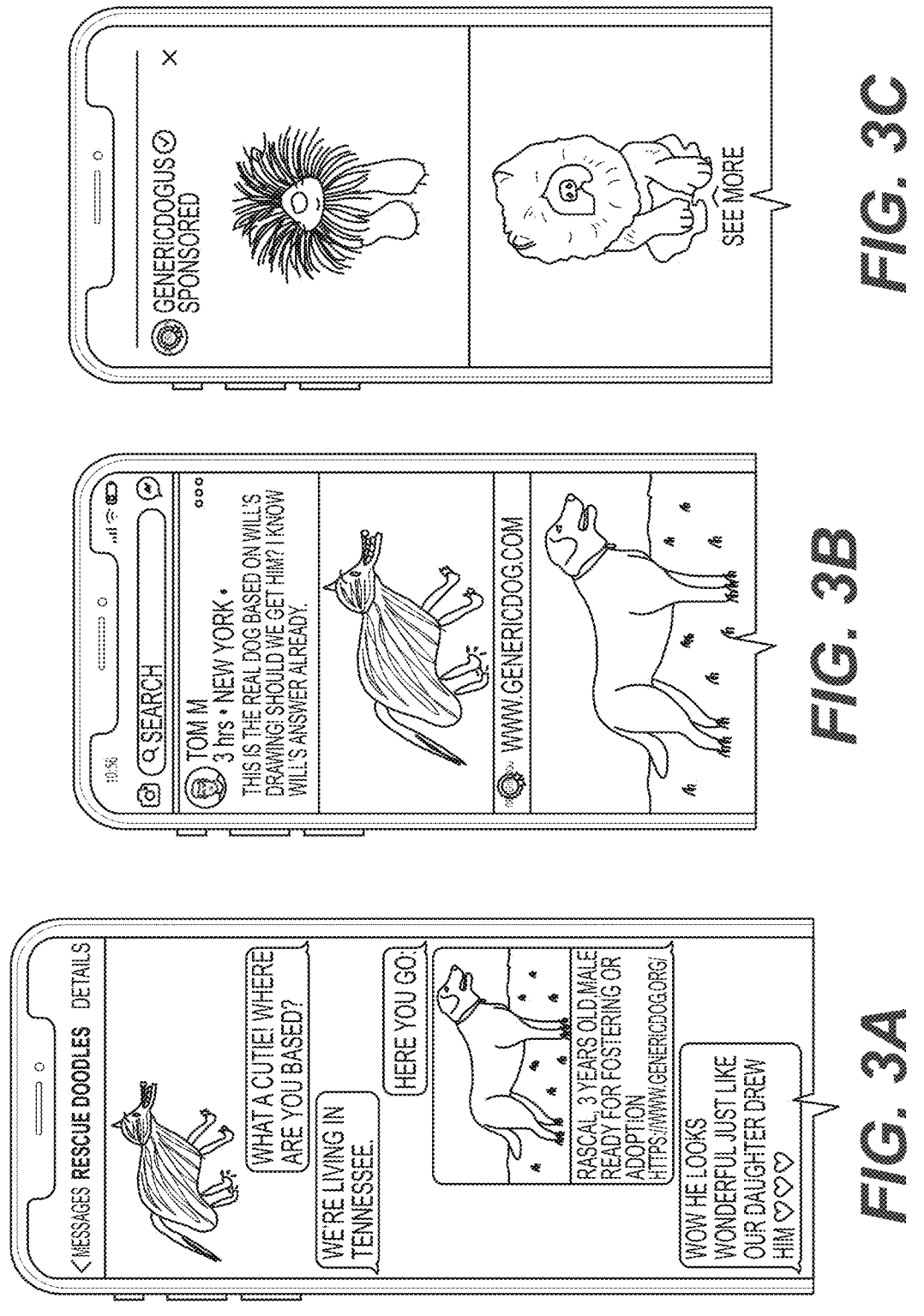
FIG. 3A depicts example interface of an exemplary platform for analyzing a pet sketch to determine a matching pet image, according to one or more embodiments.
FIG. 3B depicts an example interface of an exemplary environment for sharing a composite on at least one social media platform, according to one or more embodiments.
FIG. 3C depicts an example composite interface of an exemplary environment for analyzing a pet sketch to determine a matching pet image, according to one or more embodiments.

FIG. 3A illustrates an example interface of an exemplary platform for analyzing a pet sketch to determine a matching pet image, according to one or more embodiments. For example, uploading a pet sketch and receiving the at least one pet image may occur via a text message interaction between a user and the platform. More specifically, the user may upload a pet sketch (e.g., the top image) to the platform. The platform may then ask the user where the user is based (e.g., "What a cutie! Where are you based?"). The user may provide location information (e.g., "We're living in Tennessee."). The platform may provide at least one matching pet image (e.g., the bottom image) and corresponding information (e.g., "RASCAL, 3 years old, male ready for fostering or adoption . . . ").

FIG. 3B illustrates an example interface of an exemplary environment for sharing a composite on at least one social media platform, according to one or more embodiments. The composite may include the pet sketch (e.g., the top image) and the at least one matching pet image (e.g., the below image). The composite may be shared to at least one social media platform (e.g., Facebook). The composite may be shared, for example, by posting to the at least one social media platform.

FIG. 3C illustrates an example composite interface of an exemplary environment for analyzing a pet sketch to determine a matching pet image, according to one or more embodiments. The platform may display the composite that may include the pet sketch (e.g., the top image) and the at least one matching pet image (e.g., the below image).

Exemplary Environment and Exemplary Device

Figure 4:
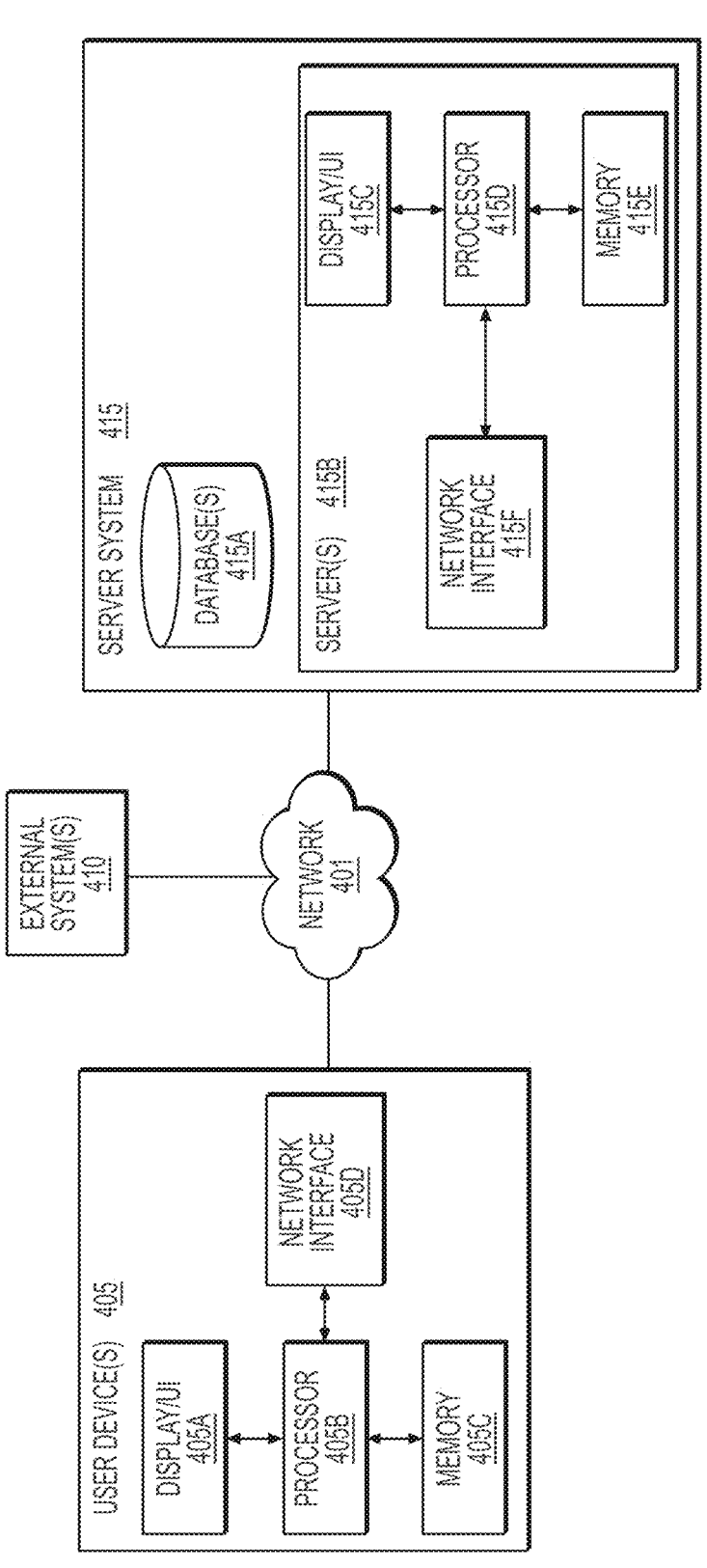
FIG. 4 depicts an exemplary environment that may be utilized with techniques presented herein, according to one or more embodiments.

FIG. 4 depicts an exemplary environment 400 that may be utilized with techniques presented herein. One or more user device(s) 405, one or more external system(s) 410, and one or more server system(s) 415 may communicate across a network 401. As will be discussed in further detail below, one or more server system(s) 415 may communicate with one or more of the other components of the environment 400 across network 401. The one or more user device(s) 405 may be associated with a user.

In some embodiments, the components of the environment 400 are associated with a common entity, e.g., a pet adoption service, a pet breeder, a pet advertiser, a pet services agency, a veterinarian, a clinic, an animal specialist, a research center, or the like. In some embodiments, one or more of the components of the environment is associated with a different entity than another. The systems and devices of the environment 400 may communicate in any arrangement.

The user device 405 may be configured to enable the user to access and/or interact with other systems in the environment 400. For example, the user device 405 may be a computer system such as, for example, a desktop computer, a mobile device, a tablet, etc. In some embodiments, the user device 405 may include one or more electronic application(s), e.g., a program, plugin, browser extension, etc., installed on a memory of the user device 405.

The user device 405 may include a display/user interface (UI) 405A, a processor 405B, a memory 405C, and/or a network interface 405D. The user device 405 may execute, by the processor 405B, an operating system (O/S) and at least one electronic application (each stored in memory 405C). The electronic application may be a desktop program, a browser program, a web client, or a mobile application program (which may also be a browser program in a mobile O/S), an applicant specific program, system control software, system monitoring software, software development tools, or the like. For example, environment 400 may extend information on a web client that may be accessed through a web browser. In some embodiments, the electronic application(s) may be associated with one or more of the other components in the environment 400. The application may manage the memory 405C, such as a database, to transmit streaming data to network 401. The display/UI 405A may be a touch screen or a display with other input systems (e.g., mouse, keyboard, etc.) so that the user(s) may interact with the application and/or the O/S. The network interface 405D may be a TCP/IP network interface for, e.g., Ethernet or wireless communications with the network 401. The processor 405B, while executing the application, may generate data and/or receive user inputs from the display/UI 405A and/or receive/transmit messages to the server system 415, and may further perform one or more operations prior to providing an output to the network 401.

External systems 410 may be, for example, one or more third party and/or auxiliary systems that integrate and/or communicate with the server system 415 in performing various image analyzing and matching tasks. For example, external systems 410 may include one or more pet shelters, one or more pet adoption agencies, and/or one or more services that include storage of pet images. Additionally, for example, such pet images may correspond to one or more pets that are available for purchase or adoption. However, the pet images may not necessarily correspond to pets that are available for purchase or adoption, and instead, such pet images may correspond to a plurality of images of pets that are stored in one or more databases. External systems 410 may be in communication with other device(s) or system(s) in the environment 400 over the one or more networks 401. For example, external systems 410 may communicate with the server system 415 via API (application programming interface) access over the one or more networks 401, and also communicate with the user device(s) 405 via web browser access over the one or more networks 401.

In various embodiments, the network 401 may be a wide area network ("WAN"), a local area network ("LAN"), a personal area network ("PAN"), or the like. In some embodiments, network 401 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The server system 415 may include an electronic data system, e.g., a computer-readable memory such as a hard drive, flash drive, disk, etc. In some embodiments, the server system 415 includes and/or interacts with an application programming interface for exchanging data to other systems, e.g., one or more of the other components of the environment.

The server system 415 may include a database 415A and at least one server 415B. The server system 415 may be a computer, system of computers (e.g., rack server(s)), and/or or a cloud service computer system. The server system may store or have access to database 415A (e.g., hosted on a third party server or in memory 415E). The server(s) may include a display/UI 415C, a processor 415D, a memory 415E, and/or a network interface 415F. The display/UI 415C may be a touch screen or a display with other input systems (e.g., mouse, keyboard, etc.) for an operator of the server 415B to control the functions of the server 415B. The server system 415 may execute, by the processor 415D, an operating system (O/S) and at least one instance of a servlet program (each stored in memory 415E).

Although depicted as separate components in FIG. 4, it should be understood that a component or portion of a component in the environment 400 may, in some embodiments, be integrated with or incorporated into one or more other components. For example, a portion of the display 415C may be integrated into the user device 405 or the like. In some embodiments, operations or aspects of one or more of the components discussed above may be distributed amongst one or more other components. Any suitable arrangement and/or integration of the various systems and devices of the environment 400 may be used.

In the previous and following methods, various acts may be described as performed or executed by a component from FIG. 4, such as the server system 415, the user device 405, or components thereof. However, it should be understood that in various embodiments, various components of the environment 400 discussed above may execute instructions or perform acts including the acts discussed above. An act performed by a device may be considered to be performed by a processor, actuator, or the like associated with that device. Further, it should be understood that in various embodiments, various steps may be added, omitted, and/or rearranged in any suitable manner.

In general, any process or operation discussed in this disclosure that is understood to be computer-implementable, such as the processes illustrated in FIGS. 1-3C, may be performed by one or more processors of a computer system, such any of the systems or devices in the environment 400 of FIG. 4, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 4. One or more processors of a computer system may be included in a single computing device or distributed among a plurality of computing devices. A memory of the computer system may include the respective memory of each computing device of the plurality of computing devices.

Figure 5:
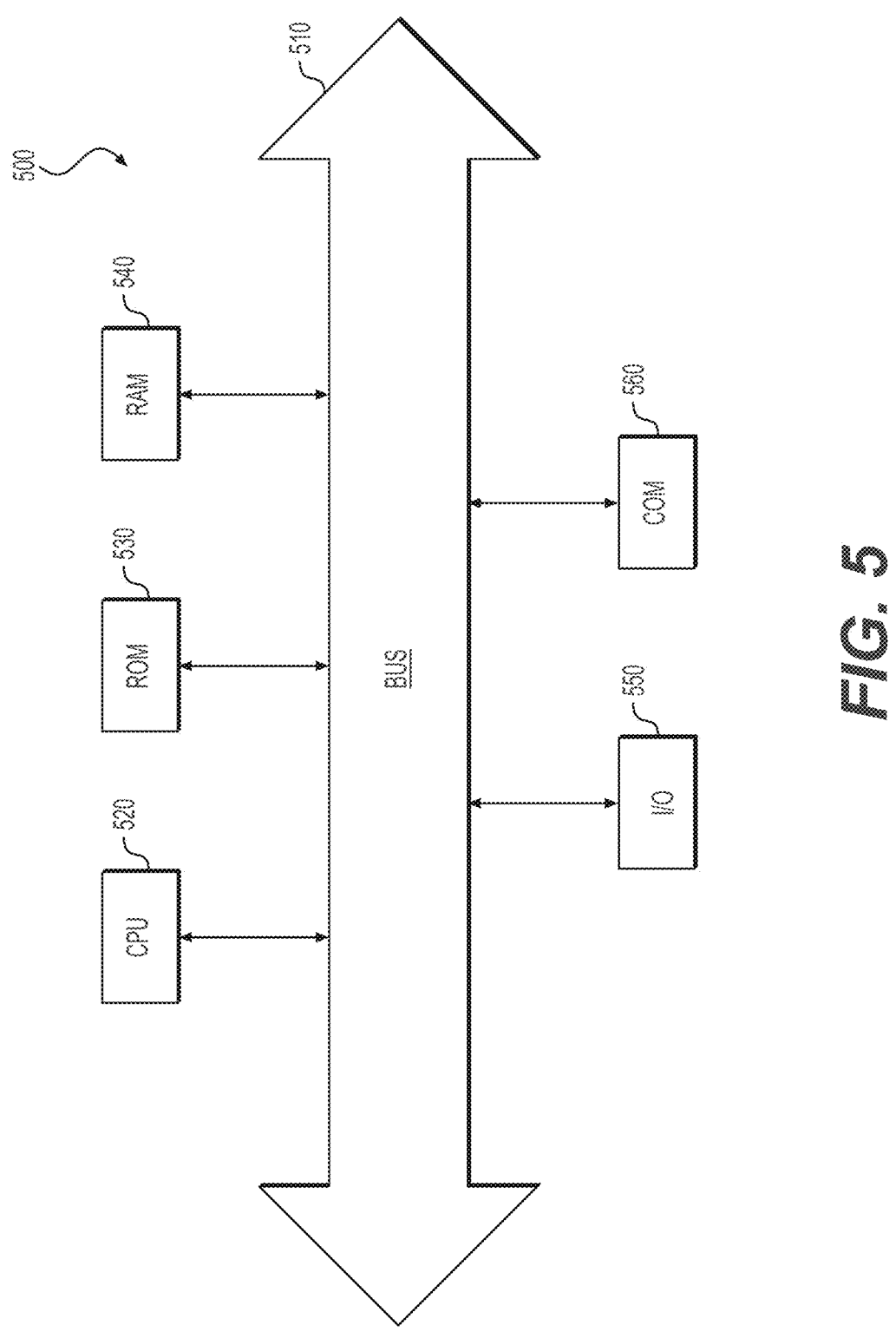
FIG. 5 depicts an example of a computing device that may execute the techniques described herein, according to one or more embodiments.

FIG. 5 is a simplified functional block diagram of a computer 500 that may be configured as a device for executing the environments and/or the methods of FIGS. 1-3C, according to exemplary embodiments of the present disclosure. For example, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the description herein and the appended drawings, wherein like elements are referred to with the same reference numerals.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the general description and the detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

As used herein, a term such as "user" or the like generally encompasses a future pet owner, future pet owners, current pet owner, and/or current pet owners. A term such as "pet"

or the like generally encompasses a domestic animal, such as a domestic canine, feline, rabbit, ferret, horse, cow, or the like. In exemplary embodiments, "pet" may refer to a canine.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for analyzing a pet sketch to determine one or more matching pet images, the method comprising:
   capturing a unique code via a user device having one or more processors;
   in response to the capturing, displaying, by the one or more processors, a prompt on the user device for a user to upload or draw a pet sketch;
   receiving, by the one or more processors, a digital image of the pet sketch drawn by the user and user location data corresponding to the user device;
   utilizing, by the one or more processors, one or more machine-learning models to remove a background of the digital image and analyze the digital image of the pet sketch to determine one or more characteristics of the digital image of the pet sketch;
   predicting, by the one or more processors, via the one or more machine-learning models, a pet breed based on the one or more characteristics;
   sending, by the one or more processors, an API request to at least one external system, the API request including the one or more characteristics of the digital image of the pet sketch, the user location data, and a characteristics threshold corresponding to a minimum characteristic matching amount;
   in response to sending the API request, receiving, by the one or more processors, one or more matching pet images and corresponding data from the at least one external system, the one or more matching pet images matching the pet sketch within the minimum characteristic matching amount defined by the characteristics threshold; and
   displaying, by the one or more processors, the predicted pet breed, the one or more matching pet images, and the corresponding data from the at least one external system on the user device.

2. The computer-implemented method of claim 1, the method further comprising:
   searching, by the one or more processors, one or more databases to find the one or more matching pet images that correspond to the pet sketch, the searching based on the one or more characteristics.

3. The computer-implemented method of claim 1, wherein the pet sketch is a user drawing or a pet photograph.

4. The computer-implemented method of claim 1, wherein the one or more machine-learning models were trained based on one or more datasets of one or more pet sketches, one or more corresponding characteristics, and one or more corresponding breeds.

5. The computer-implemented method of claim 1, wherein the at least one external system includes at least one pet adoption service.

6. The computer-implemented method of claim 1, wherein the one or more characteristics include at least one of: a color, a hair type, an ear length, a limb length to body length ratio, tail length and/or shape, a body shape, a head shape, a snout length, a color pattern, an ear shape and/or size, or snout dimensions and/or shape.

7. The computer-implemented method of claim 1, wherein the one or more matching pet images include a closest matching pet image determined by the at least one external system based on the user location data, the closest matching pet image corresponding to a matching pet located nearest the user device.

8. The computer-implemented method of claim 1, wherein the one or more matching pet images include one or more closest matching pet images determined by the at least one external system based on the user location data, the one or more closest matching pet images corresponding to one or more matching pets located within a proximity of a user location.

9. The computer-implemented method of claim 1, wherein the API request specifies only searching for the one or more matching pet images corresponding to one or more pets available for adoption or purchase.

10. The computer-implemented method of claim 9, the method further comprising:
   displaying, by the one or more processors, at least one link to the at least one external system, the at least one link corresponding to the one or more matching pet images.

11. The computer-implemented method of claim 1, the method further comprising:

storing, by the one or more processors, the pet sketch and the one or more matching pet images in one or more databases.

12. A computer system for analyzing a pet sketch to determine one or more matching pet images, the computer system comprising:

at least one memory storing instructions; and at least one processor configured to execute the instructions to perform operations comprising:

capturing a unique code via a user device having one or more processors;

in response to the capturing, displaying a prompt on the user device for a user to upload or draw a pet sketch;

receiving a digital image of the pet sketch drawn by the user and user location data corresponding to the user device;

utilizing one or more machine-learning models to remove a background of the digital image and analyze the digital image of the pet sketch to determine one or more characteristics of the digital image of the pet sketch;

predicting, via the one or more machine-learning models, a pet breed based on the one or more characteristics;

sending an API request to at least one external system, the API request including the one or more characteristics of the digital image of the pet sketch, the user location data, and a characteristics threshold corresponding to a minimum characteristic matching amount;

in response to sending the API request, receiving one or more matching pet images and corresponding data from the at least one external system, the one or more matching pet images matching the pet sketch within the minimum characteristic matching amount defined by the characteristics threshold; and displaying the predicted pet breed, the one or more matching pet images, and the corresponding data from the at least one external system on the user device.

13. The computer system of claim 12, wherein the one or more matching pet images include a closest matching pet image determined by the at least one external system based on the user location data, the closest matching pet image corresponding to a matching pet located nearest the user device.

14. The computer system of claim 12, wherein the one or more matching pet images include one or more closest matching pet images determined by the at least one external system based on the user location data, the one or more closest matching pet images corresponding to one or more matching pets located within a proximity of a user location.

15. The computer system of claim 12, wherein the API request specifies only searching for the one or more matching pet images corresponding to one or more pets available for adoption or purchase.

16. The computer system of claim 15, the operations further comprising:

displaying at least one link to the at least one external system, the at least one link corresponding to the one or more matching pet images.

17. A non-transitory computer-readable medium storing instructions that, when executed by a processor, cause the processor to perform operations for analyzing a pet sketch to determine one or more matching pet images, the operations comprising:

capturing a unique code via a user device having one or more processors;

in response to the capturing, displaying a prompt on the user device for a user to upload or draw a pet sketch;

receiving a digital image of the pet sketch drawn by the user and user location data corresponding to the user device;

utilizing one or more machine-learning models to remove a background of the digital image and analyze the digital image of the pet sketch to determine one or more characteristics of the digital image of the pet sketch;

predicting, via the one or more machine-learning models, a pet breed based on the one or more characteristics;

sending an API request to at least one external system, the API request including the one or more characteristics of the digital image of the pet sketch, the user location data, and a characteristics threshold corresponding to a minimum characteristic matching amount;

in response to sending the API request, receiving one or more matching pet images and corresponding data from the at least one external system, the one or more matching pet images matching the pet sketch within the minimum characteristic matching amount defined by the characteristics threshold; and displaying the predicted pet breed, the one or more matching pet images, and the corresponding data from the at least one external system on the user device.

18. The non-transitory computer-readable medium of claim 17, wherein the pet sketch is a user drawing or a pet photograph.

19. The non-transitory computer-readable medium of claim 17, wherein the one or more machine-learning models were trained based on one or more datasets of one or more pet sketches, one or more corresponding characteristics, and one or more corresponding breeds.

20. The non-transitory computer-readable medium of claim 17, wherein the one or more characteristics include at least one of: a color, a hair type, an ear length, a limb length to body length ratio, tail length and/or shape, a body shape, a head shape, a snout length, a color pattern, an ear shape and/or size, or snout dimensions and/or shape.

* * * * *